(12) United States Patent
Miyake et al.

(10) Patent No.: US 7,235,793 B2
(45) Date of Patent: Jun. 26, 2007

(54) RADIATION IMAGE STORAGE PANEL

(75) Inventors: Kiyoteru Miyake, Kanagawa (JP); Yuji Isoda, Kanagawa (JP); Hiroshi Matsumoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 582 days.

(21) Appl. No.: 10/867,780

(22) Filed: Jun. 16, 2004

(65) Prior Publication Data

US 2004/0256572 A1 Dec. 23, 2004

(30) Foreign Application Priority Data

Jun. 16, 2003 (JP) .............................. 2003-171084

(51) Int. Cl.
*H05B 33/00* (2006.01)
(52) U.S. Cl. .................................. 250/484.4
(58) Field of Classification Search ............ 250/484.4
See application file for complete search history.

(56) References Cited

U.S. PATENT DOCUMENTS

| 6,713,776 B2 | 3/2004 | Takahashi |
| 2001/0007352 A1 | 7/2001 | Hell et al. |
| 2003/0209675 A1* | 11/2003 | Maezawa et al. ........ 250/484.4 |
| 2004/0075386 A1* | 4/2004 | Hoshino et al. ............ 313/582 |

FOREIGN PATENT DOCUMENTS

JP 05-249298 9/1993

* cited by examiner

*Primary Examiner*—Dave Porta
*Assistant Examiner*—Marcus Taningco
(74) *Attorney, Agent, or Firm*—Sughrue Mion, PLLC

(57) ABSTRACT

A radiation image storage panel having a phosphor layer formed by a gas phase-accumulation method, in which wherein the phosphor layer is composed of an alkali metal halide stimulable phosphor activated by an activator, and the crystal lattice in the phosphor layer has a lattice distortion in the range of 0.035 to 0.30%.

7 Claims, 4 Drawing Sheets

RADIATION IMAGE STORAGE PANEL

FIELD OF THE INVENTION

The present invention relates to a radiation image storage panel for the use in a radiation image recording and reproducing method utilizing an energy-storing phosphor.

BACKGROUND OF THE INVENTION

When exposed to radiation such as X-rays, an energy-storing phosphor (stimulable phosphor, which gives stimulated emission off) absorbs and stores a portion of the radiation energy. The phosphor then emits stimulated emission according to the level of the stored energy when exposed to electromagnetic wave such as visible or infrared light (i.e., stimulating light). A radiation image recording and reproducing method utilizing the energy-storing phosphor is widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the panel; sequentially scanning the panel with a stimulating light such as a laser beam to emit stimulated light; and photo-electrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) used in the radiation image recording and reproducing method has a basic structure comprising a support and a phosphor layer provided thereon. However, if the phosphor layer is self-supporting, the support may be omitted. Further, a protective film is ordinarily provided on the free surface (surface not facing the support) of the phosphor layer to keep the phosphor layer from chemical deterioration or physical shock.

Phosphor layers of various kinds are known. Examples of the known phosphor layers include a phosphor layer comprising a binder and an energy-storing phosphor dispersed therein, a phosphor layer which is formed by a gas phase-accumulation method or by a firing method and which comprises agglomerate of an energy-storing phosphor without binder, and a phosphor layer comprising energy-storing phosphor agglomerate impregnated with a polymer material.

Referential Patent Publication 1 discloses a variation of the radiation image recording and reproducing method. While an energy-storing phosphor of the storage panel used in the conventional type plays both roles of radiation-absorbing function and energy-storing function, those two functions are separated in the disclosed method. In the method, a radiation image storage panel comprising at least an energy-storing phosphor (which stores radiation energy) is used in combination with a phosphor screen comprising another phosphor (radiation-absorbing phosphor) which absorbs radiation and emits ultraviolet or visible light. The disclosed method comprises the steps of: causing the radiation-absorbing phosphor of the screen or the panel to absorb and convert radiation having passed through an object or having radiated from an object into ultraviolet or visible light; causing the energy-storing phosphor of the panel to store the energy of the converted light as radiation image information; sequentially scanning the panel with a stimulating light to emit stimulated light; and photo-electrically detecting the emitted light to obtain electric image signals. The present invention can be also applied to the radiation image storage panel used in the method of this type.

The radiation image recording and reproducing method (or radiation image forming method) has various advantages as described above. However, it is still desired that the radiation image storage panel used in the method have as high sensitivity as possible and further give a reproduced radiation image of high quality (in regard of sharpness and graininess).

In order to improve the sensitivity and image quality, it is proposed that the phosphor layer of the storage panel be prepared by a gas phase-accumulation method such as vacuum vapor deposition or sputtering. The process of vacuum vapor deposition, for example, comprises the steps of: heating to vaporize an evaporation source comprising a phosphor or materials thereof by means of a resistance heater or an electron beam, and depositing and accumulating the vapor on a substrate such as a metal sheet to form a layer of the phosphor in the form of columnar crystals.

The phosphor layer formed by the gas phase-accumulation method contains no binder and consists of the phosphor only, and there are cracks in the columnar crystals of the phosphor. Because of the presence of cracks, the stimulating light can stimulate the phosphor efficiently and the emitted light can be collected efficiently, too.

Accordingly, a radiation image storage panel having the phosphor layer formed by the gas phase-accumulation method has high sensitivity. At the same time, since the cracks prevent the stimulating light from diffusing parallel to the layer, the storage panel can give a reproduced image of high sharpness.

When subjected to X-ray diffraction (XRD) measurement, crystalline material generally shows a diffraction pattern comprising diffraction lines. Widths of the lines are known to depend upon crystallite size, crystallinity, superlattice and inner distortion of the crystal (including variation of the composition) [Referential Non-Patent Publication 1]. If the degree of crystallinity (ratio of crystal contained in the material) and the superlattice (atomic rearrangement from an irregular lattice into a regular lattice) are negligible, the line width of XRD varies according to the crystallite size and the inner distortion of crystal. In that case, the relation among them can be expressed by Hall's equation (1):

$$\beta \cos \theta/0.9\lambda = 1/D + 2\epsilon \sin \theta/0.9\lambda \qquad (1)$$

[in which $\beta$ is a half width specific to the sample material, $D$ is a crystallite size, $\epsilon$ is a lattice distortion, $\theta$ is a Bragg angle, and $\lambda$ is a wavelength of X-ray].

If $\beta \cos \theta/0.9\lambda$ is plotted against $\sin \theta/\lambda$ according to the Hall's equation (1), a straight line having the gradient of $2\epsilon/0.9$ and the intercept of $1/D$ is obtained. Thus obtained line can make it clear whether change (increase) of XRD line width (half width) is attributed to the lattice distortion $\epsilon$ or the crystallite size $D$.

The lattice distortion (often referred to as "lattice mismatch") is represented by an average ratio of lattice constant changes based on the normal lattice constants. Generally, the lattice distortion is induced by inner distortion of the crystal, and the inner distortion is mainly caused by residual stress, which is caused by crushing and/or rolling of the material, or by what is called "variation of composition", which means non-uniformness of composition given, for example, when impurities are mixed into the sample material to form a solid solution.

Referential Patent Publication 2 discloses a radiation image storage panel having a stimulable phosphor layer comprising regularly arrayed crystals. In that phosphor layer, lattice planes of the crystals are arranged so that the ratio $I_2/I_1$ may be 0.3 or less. Here, $I_1$ and $I_2$ are intensities of the first and second peaks, respectively, in an X-ray diffraction pattern obtained by applying X-rays in an incident angle of 10° to 35° onto the lattice plane perpendicular to the direction in which the crystal grows the fastest.

Referential Patent Publication 3 discloses a binder-less storage phosphor screen comprising an alkali metal storage phosphor. The phosphor gives an XDR spectrum in which (100) and (110) diffraction lines have intensities $I_{100}$ and $I_{110}$ respectively, satisfying the condition of $I_{100}/I_{110} \geq 1$.

Referential Patent Publication 1: Japanese Patent Provisional Publication No. 2001-255610,
Referential Patent Publication 2: Japanese Patent Publication No. 3,130,632,
Referential Patent Publication 3: Japanese Patent Provisional Publication No. 2001-249198, and
Referential Non-Patent Publication 1: Yoshinori Sasaki, et al., Kihon-Kagaku Sirizu 12 (series of basic chemistry 12), "KESSHOU-KAGAKU-NYUMON (introduction of crystal chemistry)", 1999, pp. 71-75.

SUMMARY OF THE INVENTION

There is a case that an activator ion of an alkali metal halide stimulable phosphor activated by an activator often extremely differs in the ionic radius or in the ionic valence from the ions constituting the matrix crystal. In this case, when the phosphor layer is formed by a gas phase-accumulation method such as vacuum deposition, the activator and the matrix crystal are liable to separate to form different phases, so that the activator is often deposited on the surface or in the inside of the matrix crystal. It is, therefore, difficult to incorporate the activators of active state into the matrix crystals, and consequently a sufficient amount of stimulated emission is hardly obtained.

The present inventors have studied and found that, when the activator is incorporated into the matrix crystal of the phosphor, lattice distortion is caused by the mismatch of ionic radiuses or ionic valences between the activator ion and the ions of matrix crystal. Particularly in the case where the activator ion differs in the ionic valence from the matrix crystal ions, vacant holes are formed to compensate the charge mismatch and, as a result, lattice defects are formed in the crystal. At the same time, pairs of activator ion-vacant hole are also formed. Since the pairs serve as luminescence centers, the stimulated emission is enhanced. If too much vacant holes are formed, however, they serve as re-combination centers of the activator ions and consequently weaken the stimulated emission. According to the study of the inventors, the half width of diffraction line in an XRD pattern reflects degree of the lattice distortion or the lattice defects in the gas phase-accumulated layer, and the degree of distortion closely relates to the amount of stimulated emission given off from the gas phase-accumulated layer.

Accordingly, an object of the present invention is to provide a radiation image storage panel improved in sensitivity.

The present invention resides in a radiation image storage panel comprising a phosphor layer formed by a gas phase-accumulation method, wherein the phosphor layer comprises an alkali metal halide stimulable phosphor activated by an activator and has a crystal lattice having a lattice distortion in the range of 0.035 to 0.30%.

DETAILED DESCRIPTION OF THE INVENTION

Figure 1:
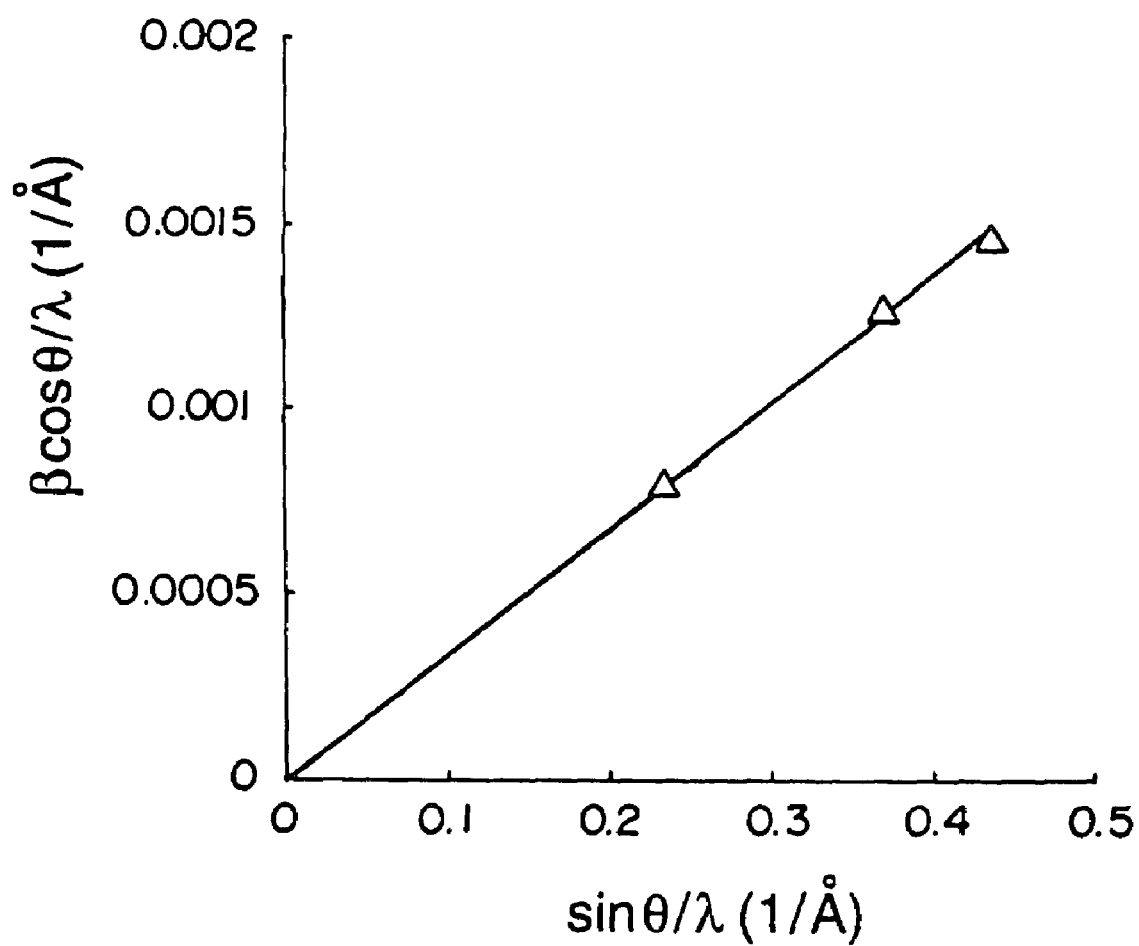
FIG. 1 is a graph obtained by plotting $\beta \cos \theta/0.9\lambda$ against $\sin \theta/\lambda$ with respect to the CsBr:Eu phosphor layer.

In the radiation image storage panel of the invention, the lattice distortion of the crystal lattice in the phosphor layer preferably is in the range of 0.040 to 0.20%, more preferably in the range of 0.050 to 0.15%.

The alkali metal halide stimulable phosphor activated by an activator preferably has the following formula (I). In the formula (I), z is preferably a number satisfying the condition of $1 \times 10^{-4} \leq z \leq 1 \times 10^{-2}$, and $M^I$, X and A are preferably Cs, Br and Eu, respectively.

Formula (I):

$$M^I X \cdot a M^{II} X'_2 \cdot b M^{III} X''_3 : zA \qquad (I)$$

[in which $M^I$ is at least one alkali metal selected from the group consisting of Li, Na, K, Rb and Cs; $M^{II}$, is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X'' is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Na, Mg, Cu, Ag, Tl and Bi; and a, b and z are numbers satisfying the conditions of $0 \leq a < 0.5$, $0 \leq b < 0.5$ and $0 < z < 1.0$, respectively].

The radiation image storage panel of the invention is explained below in detail.

The storage panel of the invention has a stimulable phosphor layer formed by a gas phase-accumulation method, and in thus formed phosphor layer columnar phosphor crystals grow almost along the thickness direction. The lattice distortion in the phosphor layer is determined in the manner described later according to the X-ray diffraction (XRD) method.

The phosphor layer of the invention comprises an alkali metal halide stimulable phosphor activated by an activator. Since the content of the activator is generally small (1 mol. % or less) as compared with the content of the phosphor matrix, the above-described crystallinity and superlattice make a negligible contribution to the change (increase) of XRD line width.

Further, although it is known that the crystallite size generally contributes to the diffraction line width if it is 0.1 μm or less, the columnar crystals in the phosphor layer of the invention have sizes of several μm or more. The crystallite size in the invention is, therefore, also negligible in contribution to the line width. In fact, if a deposited layer of CsBr:Eu phosphor, which is a representative alkali metal halide stimulable phosphor, is subjected to the X-ray diffraction measurement and $\beta \cos \theta/0.9\lambda$ is plotted against sin θ/λ according to the following Hall's equation (1), the obtained straight line passes through the origin, as shown in FIG. 1.

$$\beta \cos \theta/0.9\lambda = 1/D + 2\epsilon \sin \theta/0.9\lambda \quad (1)$$

[in which β, D, ε, θ and λ are the same as defined above]

In order to obtain points on the line in FIG. 1, the CsBr:Eu phosphor-deposited layer was subjected to the X-ray diffraction measurement in which a Cu X-ray tube (RAD-2VR, Rigaku Corporation) was used in combination with a graphite-curved monochrometer (for Kα rays) under the conditions of tube voltage: 40 kV and tube current: 30 mA in an optical system of divergency slit: 1°, scatter slit: 1°, receiving slit: 0.15 mm, and receiving slit for the monochrometer: 0.6 mm. In the measurement of half width, the contribution of $K\alpha_2$ was removed according to Rachinger's method.

Figure 2:
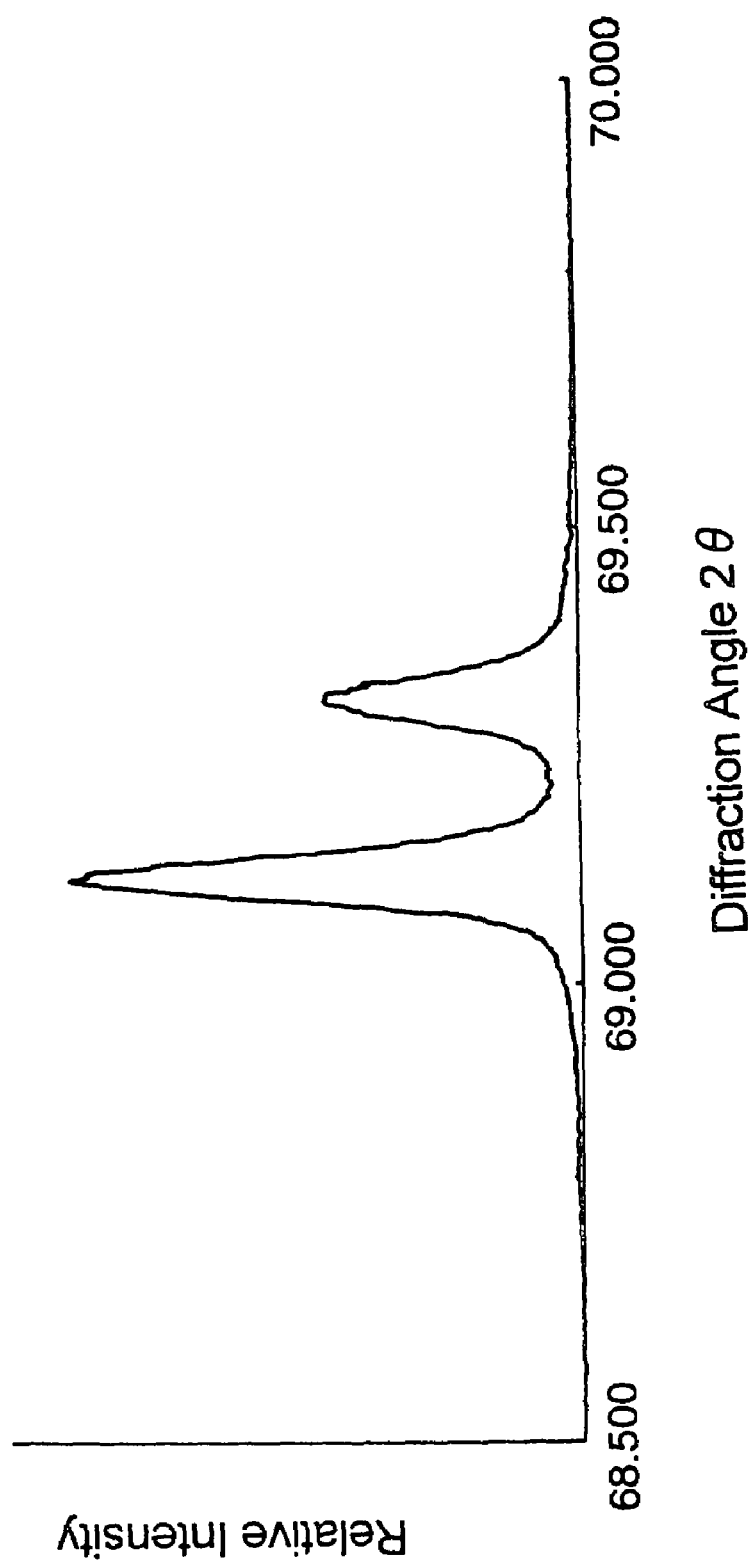
FIG. 2 is a part of the XRD pattern of Si single crystal wafer.

From the above-measured half width B, a half width b attributed to the measuring apparatus was subtracted to obtain the half width β specific to the sample material. In order to determine the half width b attributable to the measuring apparatus, a Si wafer of non-distorted single crystal having a sufficient size was used in the below-described measurement. The process of the measurement is described in detail in Kiyoteru MIYAKE et al., Nippon Shashin Gakkai-shi (The Journal of the Society of Photographic Science and Technology of Japan), vol. 63(1), pp. 4 to 11. First, the (400) face of a Si wafer having been cut parallel to the (100) face is exposed to X-rays to obtain a diffraction line, whose half width is then measured. Second, the (111) face of another Si wafer having been cut parallel to the (111) face is exposed to X-rays to obtain another diffraction line, whose half width is also measured. From the two measured half widths, a linear relation between the half width and the diffraction plane is estimated. The linear relation is approximated with an equation, by which the half width attributable to the measuring apparatus can be estimated according to what diffraction plane the diffraction angle corresponds to. FIG. 2 partly shows an XRD pattern of the Si wafer having been cut parallel to the (100) face. With respect to the above-described optical system, the half width b (in terms of degree) attributed to the measuring apparatus can be estimated by the following formula (2):

$$b = 0.005 \times \theta + 0.00399 \quad (2)$$

[in which b is the half width attributable to the measuring apparatus, and θ is a Bragg angle].

The line in FIG. 1 has the intercept of 1/D=0, which means the crystallite size D is so large that the change (increase) of diffraction line width (half width) is considered to depend upon the lattice distortion alone. Accordingly, the Hall's equation (1) is simplified into the following formula (3). In other words, the lattice distortion ε can be determined by the XRD half width β and the ½ diffraction angle (Bragg angle) θ.

$$\beta = 2\epsilon \tan \theta \quad (3)$$

[in which β, ε and θ are the same as defined above]

In the present invention, from the viewpoint of stimulated emission character, the lattice distortion ε of the crystal lattice in the phosphor layer generally id in the range of 0.035 to 0.30%, preferably in the range of 0.040 to 0.20%, more preferably in the range of 0.050 to 0.15%.

The larger the diffraction angle 2θ is, the more precisely the lattice distortion ε can be detected. In the XRD measurement adopting Cu-Kα, the phosphor layer is, therefore, preferably exposed to X-rays at 2θ of 60° or more to determine the half width of diffraction line.

If the phosphor layer comprises a phosphor matrix having the cesium chloride type-structure such as CsBr or CsI, the diffraction line attributable to (321) face or (400) face can be used. If the phosphor matrix has the sodium chloride type-structure such as RbBr or RbI, the diffraction line of (422) face or (600) face can be used. There is no restriction on the diffraction plane so long as the diffraction angle is high and an enough diffraction intensity can be obtained.

In the invention, it is presumed that the lattice distortion is mainly induced by incorporation of the activator into the matrix crystal of phosphor. Because of the difference in the ionic radius between the activator atom and the atoms constituting the matrix crystal, intervals between the ions may fluctuate microscopically.

Further, since multi-valent activator atoms are introduced, vacant holes may be formed to compensate charge mismatch. Furthermore, the activator atoms may occupy sites in the atoms constituting the lattice. These are also presumed to cause the lattice distortion.

How much to incorporate the activator into the phosphor matrix depends upon the kind and the combination thereof, but in order to obtain a lattice distortion in the above range, the amount is preferably $1 \times 10^{-4}$ mol or more based on 1 mol of the matrix. On the other hand, if the activator is added too much, concentration quenching is liable to occur. In consideration of that, the amount of the activator preferably is $1 \times 10^{-2}$ mol or less. More preferably, the amount is in the range of $5 \times 10^{-4}$ to $5 \times 10^{-3}$ mol based on 1 mol of the matrix.

If the phosphor layer has a lattice distortion in the above range, the activator incorporated in the crystal lattice effectively works as the luminescence center of stimulated emission. Further, in that crystal lattice, not only the activator-occupied sites making no contribution to the emission but also those quenching the emission are decreased. Accordingly, the stimulated emission is effectively enhanced with a small amount of the activator.

If both ionic radius and ionic valence of the activator atom are similar to those of the atoms constituting the matrix crystal, a sufficient degree of lattice distortion is hardly realized. In that case, atoms not inhibiting the emission may be doped in the matrix crystal to cause proper lattice distortion.

The phosphor used in the invention is an alkali metal halide stimulable phosphor activated by an activator, and the stimulable phosphor having the following formula (I) is preferably used.

Formula (I):

$$M^I X . a M^{II} X'_2 . b M^{III} X''_3 : zA \quad (I)$$

[in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Na, Mg, Cu, Ag, Tl and Bi; and a, b and z are numbers satisfying the conditions of $0 \leq a < 0.5$, $0 < b \leq 0.5$ and $0 < z < 1.0$, respectively].

As described above, z is preferably a number satisfying the condition of $1 \times 10^{-4} \leq z \leq 1 \times 10^{-2}$. In the formula (I), $M^I$ preferably comprises at least Cs, X preferably comprises at least Br, and A is particularly preferably Eu or Bi. Into the compound of the formula (I), metal oxides such as aluminum oxide, silicon dioxide and zirconium oxide may be added as additives, if needed, in an amount of 0.5 mol or less based on 1 mol of $M^I X$.

In the following description, the process for preparation of the radiation image storage panel of the invention is explained in detail, by way of example, referring to the case where a resistance-heating process is adopted for the gas phase-accumulation method. The resistance-heating process can be carried out under medium vacuum, and hence a preferred columnar crystal-deposited layer is easily formed. The lattice distortion of the phosphor layer can be controlled by, particularly, atmosphere of the gas-phase deposition, degree of the vacuum, temperature of the substrate, and rate of the deposition.

The substrate on which the vapor is deposited is a support which is ordinarily used as a support of the radiation image storage panel, and hence can be optionally selected from known materials conventionally used as supports of a storage panel. The substrate preferably is a sheet of quartz glass, sapphire glass; metal such as aluminum, iron, tin or chromium; or heat-resistant resin such as aramide. For improving the sensitivity or the image quality (e.g., sharpness and graininess), a conventional radiation image storage panel often has a light-reflecting layer containing a light reflecting material such as titanium dioxide or a light-absorbing layer containing a light-absorbing material such as carbon black.

These auxiliary layers can be provided on the storage panel of the invention, according to the object and the use. Further, in order to promote growth of the columnar crystals, a great number of very small convexes or concaves may be provided on the substrate surface on which the vapor is deposited. If an auxiliary layer such as a subbing layer (adhesive layer), a light-reflecting layer or a light-absorbing layer is formed on the deposited-side surface of the substrate, the convexes or concaves may be provided on the surface of the auxiliary layer. The substrate surface may be subjected to plasma cleaning.

In the case where the vapor-deposited layer is formed by vapor deposition using plural evaporation sources (co-deposition), at least two evaporation sources are used. One of the sources contains an alkali metal halide matrix material of the stimulable phosphor, and the other contains an activator material. The co-deposition is preferred because the vaporization rate of each source can be independently controlled even if the materials have very different vapor pressures. According to the composition of the desired phosphor, each source may consist of the matrix material or the activator material only or otherwise may be a mixture thereof with additives. Three or more sources may be used. For example, in addition to the above sources, an evaporation source containing additives may be used.

The matrix material of the phosphor may be either the matrix compound itself or a mixture of two or more substances that react with each other to produce the matrix compound. The activator material is generally a compound containing an activating element, for example, a halide or oxide of the activating element.

If the activator is Eu, the Eu-containing compound of the activator material preferably contains $Eu^{2+}$ in a content of 70% or more by molar ratio because the aimed stimulated emission (even if instant emission) is emitted from the phosphor activated by $Eu^{2+}$ although the Eu-containing compound generally contains both $Eu^{2+}$ and $Eu^{3+}$. The Eu-containing compound is preferably represented by $EuX_m$ (X: halogen) in which m is a number preferably satisfying the condition of $2.0 \leq m \leq 2.3$. Ideally the value of m should be 2.0, but oxygen is liable to contaminate the compound. The compound is, therefore, practically stable when m is approximately 2.2.

The evaporation source preferably has a water content of not more than 0.5 wt. %. For preventing the source from bumping, it is particularly important to control the water content in the above low range if the material of matrix or activator is a hygroscopic substance such as EuBr or CsBr. The materials are preferably dried by heating treatment at 100 to 300° C. under reduced pressure. Otherwise, the materials may be heated under dry atmosphere such as nitrogen gas atmosphere to melt at a temperature above the melting point for several minutes to several hours.

The evaporation source preferably has a relative density of preferably 80% to 98%, more preferably 90% to 96%. If the relative density is so low that the source is in the form of powder, the powder is often sprinkled during vaporization and/or the source is liable to be evaporated so unevenly that the deposited phosphor film (layer) has uneven thickness. Therefore, for ensuring stable evaporation and deposition, the relative density preferably is in the specific range. In order to control the density in the above range, generally the material in the form of powder is pressed with a pressure of 20 Mpa or more or otherwise is heated to melt at a temperature above the melting point to shape a tablet. The evaporation source, however, is not always required to be in the shape of a tablet.

The evaporation source, particularly the source containing the matrix material, contains impurities of alkali metal (alkali metals other than ones constituting the phosphor) preferably in a content of 10 ppm or less and impurities of alkaline earth metal (alkaline earth metals other than ones constituting the phosphor) preferably in a content of 1 ppm or less. Such preferred evaporation source can be prepared from materials containing the impurities little. In this way, a deposited film less contaminated with the impurities can be produced, and thus produced film gives an increased amount of emission.

The two or more evaporation sources and the substrate are placed in a vacuum evaporation-deposition apparatus. The apparatus is then evacuated to give an inner pressure of 0.03 to 3 Pa, preferably 0.05 to 2 Pa, more preferably 0.3 to 1.2 Pa. Particularly preferably, after the apparatus is evacuated to a high vacuum of $1 \times 10^{-5}$ to $1 \times 10^{-2}$ Pa, an inert gas such as Ar, Ne or $N_2$ gas is introduced into the apparatus so the inner pressure may be a medium vacuum. If so, partial pressures of water and oxygen can be reduced. The apparatus can be evacuated by means of an optional combination of, for example, a rotary pump, a turbo molecular pump, a cryo pump, a diffusion pump, and a mechanical buster.

For heating the evaporation sources, electric currents are supplied to resistance heaters. In this step, the substrate is preferably heated, and the sources are preferably heated. The temperature of the substrate generally is in the range of 50 to 250° C., preferably in the range of 80 to 200° C. The sources of matrix and activator materials are thus heated, vaporized, reacted with each other to form the phosphor, which is deposited on the substrate. The space between the substrate and the sources depends upon various conditions such as the size of substrate, but generally is in the range of 5 to 50 cm. The deposition rate, which means how fast the formed phosphor is deposited and accumulated on the substrate, can be controlled by adjusting the electric currents supplied to the heaters. The deposition rate generally is in the range of 0.1 to 100 μm/minute, preferably in the range of 1 to 20 μm/minute, more preferably in the range of 2 to 15 μm/minute.

The heating with resistance heaters may be repeated twice or more to form two or more phosphor layers. After the deposition procedure is complete, the deposited layer is subjected to heating treatment (annealing treatment), which is carried out generally at a temperature of 100 to 300° C. for 0.5 to 3 hours, preferably at a temperature of 150 to 250° C. for 0.5 to 2 hours, under inert gas atmosphere which may contain a small amount of oxygen gas or hydrogen gas. However, if the heating treatment is performed too much, the lattice distortion in the deposited layer is so relaxed that the stimulated emission is weakened.

Before preparing the above deposited film (layer) of stimulable phosphor, another deposited film (layer) consisting of the phosphor matrix alone may be beforehand formed. In this case, the resulting phosphor layer is well crystallized in the form of columnar shape. In thus formed layered films, the additives such as the activator contained in the phosphor-deposited film are diffused into the matrix alone-deposited film while they are heated during the deposition and/or during the heating treatment performed after the deposition, and consequently the interface between the films is not always clear.

In the case where the phosphor layer is produced by single evaporation source deposition, only one evaporation source containing the stimulable phosphor or a mixture of materials thereof is heated with a single resistance heater. The evaporation source is beforehand prepared so that it may contain the activator in the desired amount. Otherwise, in consideration of the gap of vapor pressure between the matrix components and the activator, the deposition procedure may be carried out while the matrix components are being supplied to the evaporation source.

Thus produced phosphor layer consists of a stimulable phosphor in the form of columnar crystals grown almost parallel to the thickness direction. The phosphor layer contains no binder and consists of the stimulable phosphor only, and there are cracks among the columnar crystals. The thickness of the phosphor layer depends on, for example, desired characters of the storage panel, conditions and process of the deposition, but ordinarily is in the range of 50 μm to 1 mm, preferably in the range of 200 to 700 μm.

The gas phase-accumulation method usable in the invention is not restricted to the above-described resistance heating process, and various other known processes such as an electron beam-application process, a sputtering process, a CVD process and an ion plating process can be used.

It is not necessary for the substrate to be used as a support of the radiation image storage panel. For example, after formed on the substrate, the deposited film is peeled from the substrate and then laminated on a support with an adhesive to prepare the phosphor layer. Otherwise, the support (substrate) may be omitted.

It is preferred to place a protective film on the surface of the phosphor layer, so as to ensure good handling of the storage panel in transportation and to avoid deterioration. The protective film preferably is transparent so as not to prevent the stimulating rays from coming in or not to prevent the emission from coming out. Further, for protecting the storage panel from chemical deterioration and physical damage, the protective film preferably is chemically stable, physically strong, and of high moisture proof.

The protective film can be provided by coating the stimulable phosphor layer with a solution in which an organic polymer such as cellulose derivatives, polymethyl methacrylate or fluororesins soluble in organic solvents is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film. Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film is generally in the range of about 0.1 to 20 μm if the film is made of polymer material or in the range of about 100 to 1,000 μm if the film is made of inorganic material such as glass.

For enhancing the resistance to stain, a fluororesin layer may be further provided on the protective film. The fluororesin layer can be formed by coating the surface of the protective film with a solution in which a fluororesin is dissolved (or dispersed) in an organic solvent, and drying the applied solution. The fluororesin may be used singly, but a mixture of the fluororesin and a film-forming resin is normally employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer is generally in the range of 0.5 to 20 μm. For forming the fluororesin layer, additives such as a crosslinking agent, a film-hardening agent and an anti-yellowing agent can be used. In particular, the crosslinking agent is advantageously employed to improve durability of the fluororesin layer.

Thus, a radiation image storage panel of the invention can be prepared. The storage panel of the invention may be in known various structures. For example, in order to improve the sharpness of the resultant image, at least one of the films (layers) may be colored with a colorant which does not absorb the stimulated emission but the stimulating ray.

EXAMPLE 1

(1) Evaporation Source

As the evaporation sources, powdery cesium bromide (CsBr, purity: 4N or more) and powdery europium bromide (EuBr$_m$, m is approx. 2.2, purity: 3N or more) were prepared. Each of them was analyzed according to ICP-MS method (Inductively Coupled Plasma Mass Spectrometry), to examine impurities. As a result, the CsBr powder contained alkali metals (Li, Na, K, Rb) other than Cs in amounts of 10 ppm or less and other elements such as alkaline earth metals (Mg, Ca, Sr, Ba) in amounts of 2 ppm or less. The EuBr$_m$ powder contained rare earth elements other than Eu in amounts of 20 ppm or less and other elements in amounts of 10 ppm or less. The powders are very hygroscopic, and hence were stored in a desiccator keeping a dry condition whose dew point was −20° C. or below. Immediately before used, they were taken out of the desiccator.

(2) Preparation of Phosphor Layer

A glass substrate (Corning) as a support was washed successively with an aqueous alkaline solution, purified water and IPA (isopropyl alcohol), and then subjected to plasma cleaning. The thus-treated substrate was mounted to a substrate holder in an evaporation apparatus. Each of the CsBr and EuBr$_m$ evaporation sources was placed in a crucible equipped with resistance heater in the apparatus. The distance between the substrate and each source was 10 cm. The apparatus was evacuated to make the inner pressure $1 \times 10^{-4}$ Pa by means a combination of a turbo molecular pump and a mechanical buster, and then Ar gas was introduced to set the inner pressure at 0.9 Pa (Ar gas pressure). Subsequently, the substrate was heated to 200° C. by means of a sheath heater placed on the back side (the opposite side to the face which the vapor is to be deposited on). Each evaporation source was also heated, and a shutter covering the CsBr source was first opened so that CsBr was alone accumulated on the substrate to form a layer of phosphor matrix (thickness: 50 μm). Another shutter covering the EuBr$_m$ source was then opened so that CsBr:Eu stimulable phosphor was accumulated on the matrix layer. During the deposition, the electric currents supplied to the heaters were controlled so that the molar ratio of Eu/Cs in the stimulable phosphor would be 0.001/1 and so that the deposition rate might be 13.3 μm/minute. After the evaporation-deposition was complete, the inner pressure was returned to atmospheric pressure and then the substrate was taken out of the apparatus. On the substrate, a deposited film (thickness: approx. 500 μm, area: 10 cm×10 cm) consisting of columnar phosphor crystals aligned densely and almost perpendicularly was formed.

The substrate was then placed in a quartz boat, and then inserted into the core of a tube furnace. For removing water adsorbed on the deposited layer, the furnace was evacuated to make the inner pressure about 10 Pa by means a rotary pump. With this inner pressure kept, the deposited layer was subjected to heating treatment at 200° C. for 1 hour under N$_2$ atmosphere. After enough cooled under N$_2$ atmosphere, the substrate was taken out of the furnace. Thus, a radiation image storage panel of the invention comprising the support and the phosphor layer was produced.

EXAMPLES 2 TO 6

The procedures of Example 1 were repeated except that, in Example 1 (2), the temperature at which the substrate was heated and/or the deposition rate were changed as shown in Table 1, to produce various radiation image storage panels of the invention.

COMPARISON EXAMPLES 1 TO 3

The procedures of Example 1 were repeated except that, in Example 1 (2), the temperature at which the substrate was heated and/or the deposition rate were changed as shown in Table 1, to produce various radiation image storage panels for comparison.

REFERENTIAL EXAMPLE 1

CsBr Layer

The procedures of Example 1 were repeated except that only the CsBr evaporation source was prepared and used and that, in Example 1 (2), the temperature at which the substrate was heated and the deposition rate were changed as shown in Table 1, to produce a referential radiation image storage panel.

EXAMPLE 7

The phosphor layer prepared in Example 3 was further subjected to heating treatment at 200° C. for 1 hour, to produce a radiation image storage panel of the invention.

COMPARISON EXAMPLE 4

The phosphor layer prepared in Example 3 was further subjected to heating treatment at 200° C. for 3 hour, to produce a radiation image storage panel for comparison.

EXAMPLES 8 TO 10

Mono-vapor Deposition

The procedures of Example 1 were repeated except that a mixture of CsBr powder and EuBr$_m$ powder was used as the evaporation source and that the temperature at which the substrate was heated, the distance between the substrate and the source, the Ar gas pressure and/or the deposition rate were changed as shown in Table 1, to produce various radiation image storage panels of the invention.

EXAMPLES 11 TO 14

The procedures of Example 1 were repeated except that, in Example 1 (2), the temperature at which the substrate was heated, the distance between the substrate and the source, the Ar gas pressure, the rotation of the substrate, the thickness of the phosphor matrix layer and/or the deposition rate were changed as shown in Table 1, to produce various radiation image storage panels of the invention.

EXAMPLE 15

The procedures of Example 1 were repeated except that an aluminum substrate was used as the support and that, in Example 1 (2), the temperature at which the substrate was heated, the Ar gas pressure and the deposition rate were changed as shown in Table 1, to produce a radiation image storage panel of the invention.

COMPARISON EXAMPLE 5

The procedures of Example 1 were repeated except that an aluminum substrate was used as the support and that, in Example 1 (2), the temperature at which the substrate was heated, the Ar gas pressure, the thickness of the phosphor matrix layer and the deposition rate were changed as shown in Table 1, to produce a radiation image storage panel for comparison.

Evaluation of Radiation Image Storage Panel (1)

With respect to the phosphor layer of each produced radiation image storage panel, the lattice distortion was determined in the following manner. Each phosphor layer was subjected to the XRD measurement by means of an X-ray diffraction apparatus (Rigaku Corporation) to obtain an XRD pattern. In the pattern, a diffraction line attributed to (400) face appeared at the diffraction angle 2θ of about 98.1°. The half width B of the diffraction line was measured. On the other hand, the above θ was substituted into the formula (2) to obtain the half width b attributed to the apparatus. According to β=B−b, the half width β specific to the sample was obtained. The formula (3) was applied to the obtained β and θ, and thereby the lattice distortion ε was calculated.

The sensitivity of each storage panel was evaluated in the following manner. Each radiation image storage panel was encased in a room light-shielding cassette and then exposed to X-rays (voltage: 80 kVp, current: 16 mA). The storage panel was then taken out of the cassette and excited with a semiconductor laser beam (wavelength: 660 nm), and sequentially the emitted stimulated emission was detected by a photomultiplier. On the basis of the detected stimulated emission intensity (converted into a relative value based on the intensity of Example 1), the sensitivity was evaluated.

Figure 3:
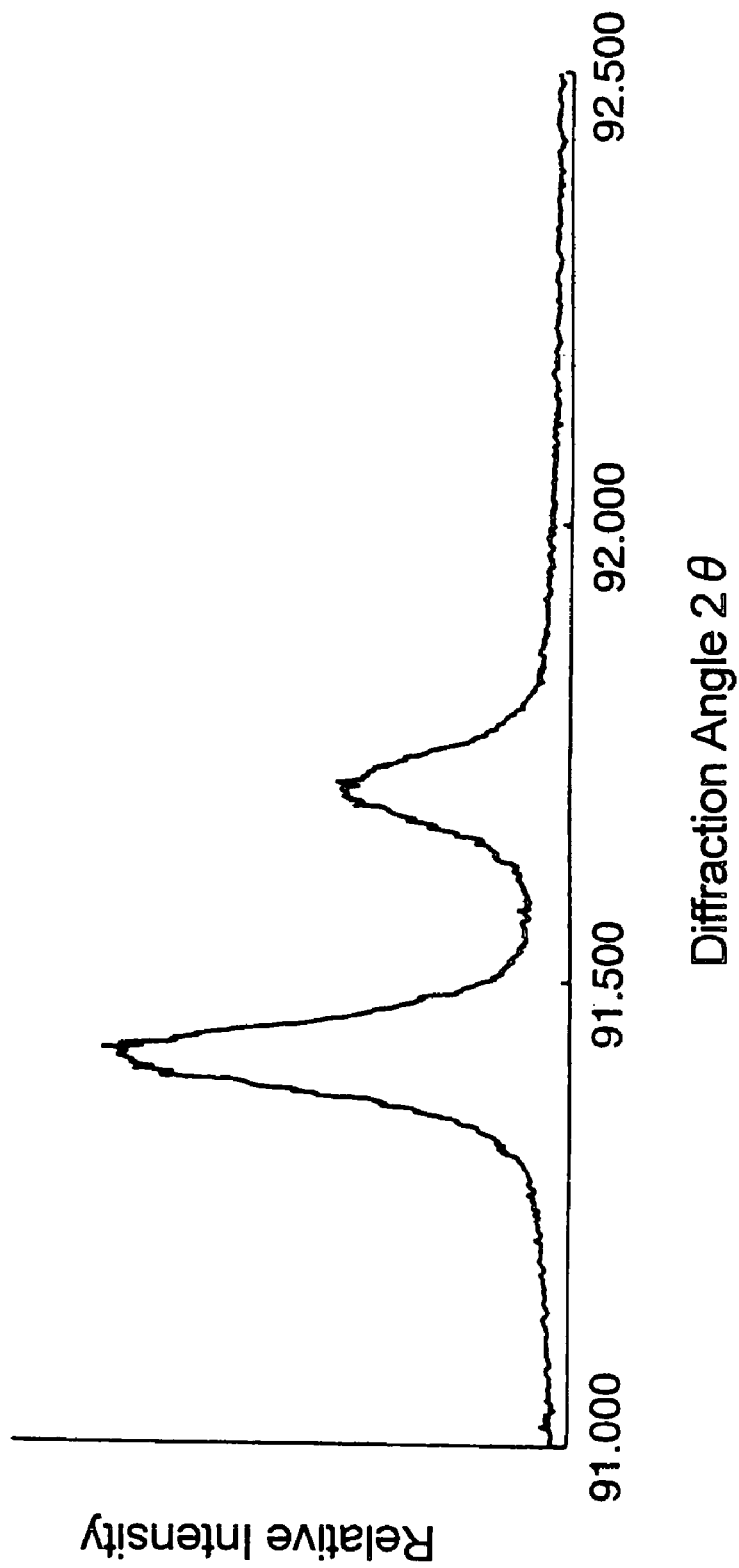
FIG. 3 is a part of the XRD pattern of CsBr layer.
Figure 4:
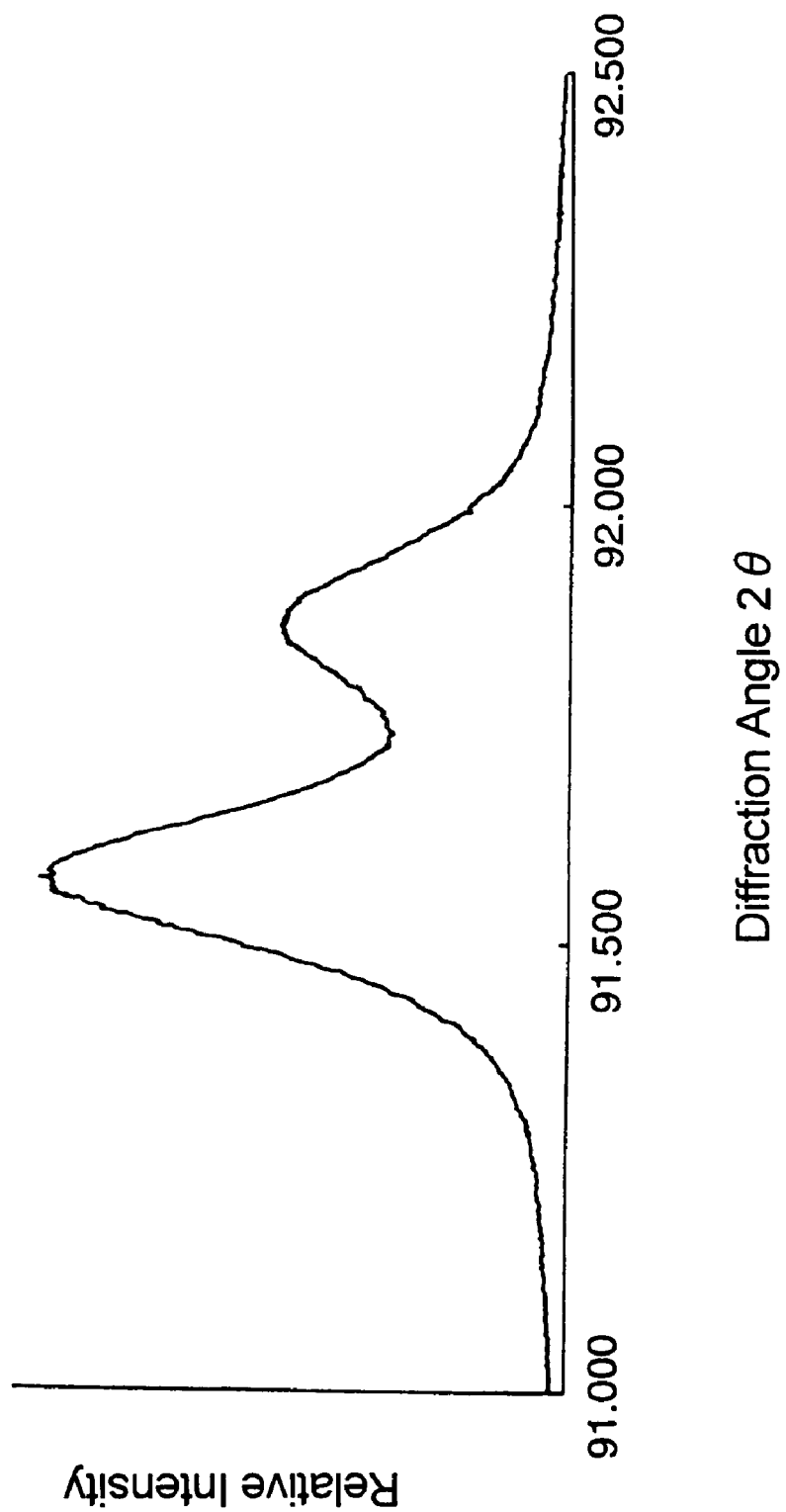
FIG. 4 is a part of the XRD pattern of CsBr:Eu phosphor layer.

The results are set forth in Table 1. The XRD patterns of Referential Example 1 and Example 13 are shown in FIGS. 3 and 4, respectively.

TABLE 1

| Ex. | Temp. of substrate (° C.) | Ar gas pressure (Pa) | LTS[1] (cm) | Rotation of substrate |
|---|---|---|---|---|
| Ex. 1 | 200 | 0.9 | 10 | not rotated |
| Ex. 2 | 200 | 0.9 | 10 | not rotated |
| Ex. 3 | 200 | 0.9 | 10 | not rotated |
| Ex. 4 | 150 | 0.9 | 10 | not rotated |
| Ex. 5 | 150 | 0.9 | 10 | not rotated |
| Ex. 6 | 150 | 0.9 | 10 | not rotated |
| Com. 1 | 200 | 0.9 | 10 | not rotated |
| Com. 2 | 200 | 0.9 | 10 | not rotated |
| Com. 3 | 280 | 0.9 | 10 | not rotated |
| Ref. 1 | 300 | 0.9 | 10 | not rotated |
| Ex. 7 | 200 | 0.9 | 10 | not rotated |
| Com. 4 | 200 | 0.9 | 10 | not rotated |
| Ex. 8 | 130 | 1.5 | 20 | not rotated |
| Ex. 9 | 130 | 1.0 | 20 | not rotated |
| Ex. 10 | 130 | 0.5 | 20 | not rotated |
| Ex. 11 | 230 | 0.7 | 10 | rotated |
| Ex. 12 | 180 | 0.7 | 10 | rotated |
| Ex. 13 | 120 | 0.7 | 10 | rotated |
| Ex. 14 | 100 | 0.7 | 20 | rotated |
| Ex. 15 | 230 | 1.0 | 10 | not rotated |
| Com. 5 | 230 | 1.5 | 10 | not rotated |

| Ex. | Matrix layer (μm) | Deposition rate (μm/min.) | Source | Halt width B (degree) | Lattice distortion (%) | Sensitivity |
|---|---|---|---|---|---|---|
| Ex. 1 | 50 | 13.3 | two | 0.112 | 0.042 | 100 |
| Ex. 2 | 50 | 10.2 | two | 0.121 | 0.049 | 127 |
| Ex. 3 | 50 | 7.7 | two | 0.125 | 0.053 | 155 |
| Ex. 4 | 50 | 10.2 | two | 0.141 | 0.066 | 159 |
| Ex. 5 | 50 | 5.2 | two | 0.152 | 0.075 | 171 |
| Ex. 6 | 50 | 1.7 | two | 0.193 | 0.110 | 192 |
| Com. 1 | 50 | 51.0 | two | 0.085 | 0.019 | 45 |
| Com. 2 | 50 | 20.3 | two | 0.091 | 0.024 | 60 |
| Com. 3 | 50 | 7.7 | two | 0.087 | 0.020 | 55 |
| Ref. 1 | — | 26.0 | one | 0.082 | 0.016 | — |
| Ex. 7 | 50 | 7.7 | two | 0.11 | 0.040 | 110 |
| Com. 4 | 50 | 7.7 | two | 0.086 | 0.020 | 50 |
| Ex. 8 | — | 3.5 | one | 0.251 | 0.159 | 97 |
| Ex. 9 | — | 3.5 | one | 0.194 | 0.111 | 175 |
| Ex. 10 | — | 3.5 | one | 0.158 | 0.080 | 144 |
| Ex. 11 | 5 | 7.8 | two | 0.108 | 0.038 | 112 |
| Ex. 12 | 5 | 7.8 | two | 0.168 | 0.089 | 155 |
| Ex. 13 | 5 | 7.8 | two | 0.195 | 0.112 | 197 |
| Ex. 14 | 5 | 7.8 | two | 0.222 | 0.135 | 171 |
| Ex. 15 | 50 | 5.2 | two | 0.12 | 0.048 | 125 |
| Com. 5 | 5 | 15.0 | two | 0.102 | 0.033 | 82 |

[1]LTS: Distance between the substrate and the evaporation source(s).

FIG. 3 partly shows an XRD pattern of the CsBr layer formed in Referential Example 1.

FIG. 4 partly shows an XRD pattern of the CsBr:Eu phosphor layer formed in Example 13.

The results shown in Table 1 indicate that the radiation image storage panels of the invention (Examples 1 to 15), each of which had a lattice distortion in the range of 0.035 to 0.30%, have higher sensitivities than the panels for comparison (Comparison Examples 1 to 5), each of which had a lattice distortion of less than 0.035%. In particular, if having a lattice distortion of 0.050 to 0.15%, the storage panel had a remarkably improved sensitivity.

Comparison of the results of Examples 1 to 3 with those of Comparison Examples 1 and 2 makes it clear that the lattice distortion is apt to increase according as the deposition rate slows down. Also by comparison of Example 3 with Comparison Example 3, it is suggested that a larger lattice distortion is apt to be obtained when the substrate is heated at a lower temperature. Further, according to comparison of Examples 3 and 7 with Comparison Example 4, the lattice distortion is reduced to impair the sensitivity if the heating treatment is performed too much. In Referential Example 1, the lattice distortion was caused even in the layer of CsBr alone. The reason of this is presumed to be due to the Ar gas atmosphere.

EXAMPLE 16

Deposition by Electron Beam Application (1) Evaporation Source

The procedures of Example 1 were repeated to prepare powdery CsBr and powdery $EuBr_m$ as the evaporation sources.

(2) Preparation of Phosphor Layer

A glass substrate (Corning) as a support was washed successively with an aqueous alkaline solution, purified water and IPA (isopropyl alcohol), and then subjected to plasma cleaning. The thus-treated substrate was mounted to a substrate holder in an evaporation apparatus. The CsBr and $EuBr_m$ evaporation sources were placed at predetermined positions in the apparatus. The distance between the substrate and each source was 20 cm. The apparatus was then evacuated to make the inner pressure $1\times10^{-4}$ Pa by means a combination of a rotary pump, a turbo molecular pump and a mechanical buster. The substrate was heated to 200° C. by means of a sheath heater placed on the back side (the opposite side to the face which the vapor is to be deposited on). Electron beams from electron guns were individually applied onto the sources, and a shutter covering the CsBr source was first opened so that CsBr was alone accumulated on the substrate to form a layer of phosphor matrix (thickness: 20 μm). Another shutter covering the $EuBr_m$ source was then opened so that CsBr:Eu stimulable phosphor was accumulated on the matrix layer. During the deposition, the emission currents supplied to the electron guns were controlled so that the molar ratio of Eu/Cs in the stimulable phosphor might be 0.003/1 and so that the deposition rate might be 4.7 μm/minute. After the evaporation-deposition was complete, the inner pressure was returned to atmospheric pressure and then the substrate was taken out of the apparatus. On the substrate, a deposited film (thickness: approx. 100 μm, area: 10 cm×10 cm) consisting of columnar phosphor crystals aligned densely and almost perpendicularly was formed.

The deposited film was subjected to the heating treatment in the same manner as in Example 1. Thus, a radiation image storage panel of the invention comprising the support and the phosphor layer was produced.

EXAMPLES 17 AND 18

The procedures of Example 16 were repeated except that, in Example 16 (2), the temperature at which the substrate was heated and/or the deposition rate were changed as shown in Table 2, to produce various radiation image storage panels of the invention.

COMPARISON EXAMPLE 6

The procedures of Example 16 were repeated except that, in Example 16 (2), the temperature at which the substrate was heated and the deposition rate were changed as shown in Table 2, to produce a radiation image storage panel for comparison.

Evaluation of Radiation Image Storage Panel (2)

With respect to the phosphor layer of each produced radiation image storage panel, the lattice distortion was determined in the above-described manner except for measuring a half width B of the diffraction line attributed to (321) face. The line appeared at the diffraction angle 2θ of about 65.2°. The sensitivity of each panel was also evaluated in the same manner as described above.

The results are set forth in Table 2. The value of sensitivity was shown not only in the above relative value but also in a converted value provided that the thickness of the phosphor layer was normalized to 500 μm.

TABLE 2

| Ex. | Temp. of substrate (° C.) | Ar gas pressure (Pa) | LTS[1] (cm) | Rotation of substrate |
|---|---|---|---|---|
| Ex. 16 | 200 | 1 × 10$^{-4}$ | 20 | not rotated |
| Ex. 17 | 100 | 1 × 10$^{-4}$ | 20 | not rotated |
| Ex. 18 | 200 | 1 × 10$^{-4}$ | 20 | not rotated |
| Com. 6 | 300 | 1 × 10$^{-4}$ | 20 | not rotated |

| Ex. | Matrix layer (μm) | Deposition rate (μm/min.) | Half width B (degree) | Lattice distortion (%) | Sensitivity | converted |
|---|---|---|---|---|---|---|
| Ex. 16 | 20 | 4.7 | 0.171 | 0.106 | 31 | 155 |
| Ex. 17 | 20 | 5.0 | 0.209 | 0.142 | 34 | 170 |
| Ex. 16 | 20 | 4.8 | 0.145 | 0.081 | 26 | 130 |
| Com. 6 | 20 | 4.9 | 0.093 | 0.031 | 15 | 75 |

[1]LTS: Distance between the substrate and the evaporation source(s).

The results shown in Table 2 indicate that the radiation image storage panels of the invention (Examples 16 to 18), each of which had a lattice distortion in the range of 0.035 to 0.30%, have higher sensitivities than the panel for comparison (Comparison Example 6), which had a lattice distortion of less than 0.035%.

EFFECT OF THE INVENTION

The radiation image storage panel of the invention comprises a phosphor layer in which the crystal of the phosphor has a lattice distortion in a particular range.

In that phosphor crystal, the activator is incorporated in the matrix crystal effectively enough to serve as the luminescence center of stimulated emission and, as a result, to improve the sensitivity of the panel. Accordingly, the radiation image storage panel of the invention is advantageously used for medical diagnosis.

What is claimed is:

1. A radiation image storage panel comprising a phosphor layer formed by a gas phase-accumulation method, wherein the phosphor layer comprises an alkali metal halide stimulable phosphor activated by an activator and has a crystal lattice having a lattice distortion in the range of 0.035 to 0.30%.

2. The radiation image storage panel of claim 1, wherein the crystal lattice in the phosphor layer has a lattice distortion in the range of 0.040 to 0.20%.

3. The radiation image storage panel of claim 2, wherein the crystal lattice in the phosphor layer has a lattice distortion in the range of 0.050 to 0.15%.

4. The radiation image storage panel of claim 1, wherein the alkali metal halide stimulable phosphor activated by an activator has the following formula (I):

$$M^{I}X.aM^{II}X'_{2}.bM^{III}X''_{3}:zA \qquad (I)$$

in which $M^{I}$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" independently is at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Na, Mg, Cu, Ag, Il and Bi; and a, b and z are numbers satisfying the conditions of 0≦a<0.5, 0≦b<0.5 and 0<z<1.0, respectively.

5. The radiation image storage panel of claim 4, wherein z in the formula (I) is a number satisfying the condition of $1 \times 10^{-4} \leq z \leq 1 \times 10^{-2}$.

6. The radiation image storage panel of claim 4, wherein $M^{I}$, X and A in the formula (I) are Cs, Br and Eu, respectively.

7. The radiation image storage panel of claim 5, wherein $M^{I}$, X and A in the formula (I) are Cs, Br and Eu, respectively.

* * * * *